US011897662B2

(12) United States Patent
Todaka

(10) Patent No.: US 11,897,662 B2
(45) Date of Patent: Feb. 13, 2024

(54) BAG WITH ATTACHED ZIPPER TAPE, MANUFACTURING METHOD OF BAG WITH ATTACHED ZIPPER TAPE

(71) Applicant: IDEMITSU UNITECH CO., LTD., Tokyo (JP)

(72) Inventor: Takumi Todaka, Tokyo (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 0 days.

(21) Appl. No.: 17/993,032

(22) Filed: Nov. 23, 2022

(65) Prior Publication Data

US 2023/0087343 A1 Mar. 23, 2023

Related U.S. Application Data

(62) Division of application No. 16/770,796, filed as application No. PCT/JP2018/044617 on Dec. 4, 2018, now Pat. No. 11,542,065.

(30) Foreign Application Priority Data

Dec. 8, 2017 (JP) ................................ 2017-235794

(51) Int. Cl.
*B65D 33/25* (2006.01)
*B31B 70/81* (2017.01)
*B31B 160/10* (2017.01)

(52) U.S. Cl.
CPC ...... *B65D 33/2508* (2013.01); *B31B 70/8131* (2017.08); *B31B 2160/102* (2017.08)

(58) Field of Classification Search
CPC .......... B65D 1/00; B65D 23/00; B65D 27/00
(Continued)

(56) References Cited

U.S. PATENT DOCUMENTS

2003/0138171 A1 7/2003 Kikuchi
2007/0101556 A1 5/2007 Blythe et al.
(Continued)

FOREIGN PATENT DOCUMENTS

CN 102686121 A 9/2012
JP 53-778 A 1/1978
(Continued)

OTHER PUBLICATIONS

Office Action in corresponding Taiwanese patent application No. 107144129 dated Jul. 7, 2022 (pp. 1-12).
(Continued)

*Primary Examiner* — Jacob A Smith
(74) *Attorney, Agent, or Firm* — MILLEN, WHITE, ZELANO & BRANIGAN, PC; Ryan Pool

(57) ABSTRACT

In order to allow a bag to be easily unsealed by sliding both sides of the bag in a longitudinal direction of a zipper tape irrespective of the rigidity of the zipper tape, a zipper-tape bag according to an aspect of the invention includes: a bag body including at least a pair of facing surfaces; and an elongated zipper tape whose cross sectional profile includes first and second bases each bonded to corresponding one of facing surfaces, and mutually engageable first and second engagement portion respectively protruded from the first and second bases, the zipper tape including an intermediate hinge at at least one point in the longitudinal direction.

14 Claims, 13 Drawing Sheets

(58) Field of Classification Search
USPC ........ 493/213, 927, 394, 210, 214, 211, 405
See application file for complete search history.

(56) References Cited

U.S. PATENT DOCUMENTS

| | | | | |
|---|---|---|---|---|
| 2007/0266532 | A1* | 11/2007 | Katada | B65D 33/2533 24/399 |
| 2012/0201480 | A1 | 8/2012 | Goto et al. | |
| 2012/0202667 | A1 | 8/2012 | Greco et al. | |
| 2012/0301056 | A1 | 11/2012 | Anzini et al. | |
| 2014/0112601 | A1* | 4/2014 | Shioda | B65D 33/2541 24/400 |
| 2014/0143988 | A1 | 5/2014 | Septien Rojas et al. | |
| 2014/0161374 | A1 | 6/2014 | Septien Rojas et al. | |
| 2015/0158637 | A1 | 6/2015 | Kosub, Sr. et al. | |
| 2016/0101904 | A1 | 4/2016 | Takigawa | |
| 2016/0194117 | A1* | 7/2016 | Goto | B65D 33/2541 383/63 |
| 2018/0086508 | A1 | 3/2018 | Namba | |
| 2018/0257820 | A1 | 9/2018 | Tameda et al. | |

FOREIGN PATENT DOCUMENTS

| | | | | | |
|---|---|---|---|---|---|
| JP | S-53778 | | * | 1/1978 | B65D 31/00 |
| JP | S53778 | A | | 1/1978 | |
| JP | 59-131310 | A | | 7/1984 | |
| JP | 9-169349 | A | | 6/1997 | |
| JP | 09169349 | A | * | 6/1997 | B65D 81/3461 |
| JP | 9169349 | A2 | | 6/1997 | |
| JP | 2001-509119 | A | | 7/2001 | |
| JP | 2003276099 | A | | 9/2003 | |
| JP | 2010-120190 | A | | 6/2010 | |
| JP | 2010120190 | A | | 6/2010 | |
| JP | 2012-76813 | A | | 4/2012 | |
| JP | 2013139279 | A | | 7/2013 | |
| JP | 2013-212853 | A | | 10/2013 | |
| JP | 2015-116269 | A | | 6/2015 | |
| JP | 2015-217980 | A | | 12/2015 | |
| JP | 2015-217981 | A | | 12/2015 | |
| JP | 2015217981 | A | | 12/2015 | |
| JP | 2015217981 | A | * | 12/2015 | B31B 70/8132 |
| JP | 2016-55902 | A | | 4/2016 | |
| JP | 2016-74474 | A | | 5/2016 | |
| JP | 2016-88516 | A | | 5/2016 | |
| JP | 2016-88531 | A | | 5/2016 | |
| JP | 2016-104376 | A | | 6/2016 | |
| JP | 2017-104485 | A | | 6/2017 | |
| JP | 2017104485 | A | * | 6/2017 | A44B 19/16 |
| JP | 2017104485 | A | | 6/2017 | |
| JP | 2017-226478 | A | | 12/2017 | |
| TW | 201641378 | A | | 12/2016 | |
| TW | 201718359 | A | | 6/2017 | |
| TW | 201718360 | A | | 6/2017 | |
| WO | 2012075007 | A1 | | 6/2012 | |

OTHER PUBLICATIONS

Office Action issued in corresponding Chinese application No. 201880078580.2 pp. 1-10).
Search report issued in corresponding EP 18885214.9 dated Jul. 22, 2021 (pp. 1-9).
Written Opinion in PCT/JP2018/044617 dated Jun. 9, 2020 (pp. 1-12 ).
International Search Report dated Feb. 12, 2019 issued in corresponding PCT/JP2018/044617 application (2 pages).
English Abstract of JP 59-131310 A published Jul. 28, 1994.
English Abstract of JP 09-169349 A published Jun. 30, 1997.
English Abstract of JP 2017-226478 A published Dec. 28, 2017.
English Abstract of JP 2017-104485 A published Jun. 15, 2017.
English Abstract of JP 2016-104376 A published Jun. 9, 2016.
English Abstract of JP 2016-088531 A published May 23, 2016.
English Abstract of JP 2016-088516 A published May 23, 2016.
English Abstract of JP 2016-074474 A published May 12, 2016.
English Abstract of JP 2016-055902 A published Apr. 21, 2016.
English Abstract of JP 2015-217981 A published Dec. 7, 2015.
English Abstract of JP 2015-217980 A published Dec. 7, 2015.
English Abstract of JP 2015-116269 A published Jun. 25, 2015.
English Abstract of JP 2013-212853 A published Oct. 17, 2013.
English Abstract of JP 2012-076813 A published Apr. 19, 2012.
English Abstract of JP 2010-120190 A published Jun. 3, 2010.
English Abstract of JP 2001-509119 A published Jul. 10, 2001.

* cited by examiner (A)

(B)

600

BAG WITH ATTACHED ZIPPER TAPE, MANUFACTURING METHOD OF BAG WITH ATTACHED ZIPPER TAPE

TECHNICAL FIELD

The preset invention relates to a zipper-tape bag, and a manufacturing method of the zipper-tape bag.

BACKGROUND ART

Zipper-tape bags have been widely used for packaging various goods such as medicines and foods. One of the advantages of the zipper-tape bags is that the zipper-tape bags are easily unsealable and resealable. The bag can be unsealed by a user's operation of pulling both sides of the bag, onto which the zipper tape is bonded, in a direction away from each other to disengage the zipper tape. In contrast, the user can engage the zipper tape to reseal the bag by pressing the both sides of the bag so that the sides move toward each other.

The both sides of the bag are typically pinched by fingers and pulled in a direction perpendicular to a longitudinal direction of the zipper tape in unsealing the zipper-tape bag. In this case, both hands of a user are required for the unsealing. In contrast, Patent Literature 1 discloses a bag capable of being unsealed by a user's operation of mutually oppositely sliding both sides of the bag along a longitudinal direction of the zipper tape. In this case, the user can disengage the zipper tape to unseal the bag by pinching and twisting the both sides of the bag by fingers (specifically, a thumb and an index finger) of one hand.

CITATION LIST

Patent Literature(s)

Patent Literature 1 U.S. Patent Application Publication No. 2003/0138171

SUMMARY OF THE INVENTION

Problem(s) to be Solved by the Invention

According to the disclosure of Patent Literature 1, only one of the sides of the bag is bent while the other of the sides is not bent at the part pinched by the user, so that a difference is created in the lengths of the zipper tape bonded to the both sides of the bag, resulting in disengagement of the zipper tape. However, such an unsealing operation is possible only in a zipper tape having low rigidity and low engagement strength. Some of the zipper tapes are made of a material with high rigidity to enhance the engagement strength in order to resist an internal pressure of the bag and/or prevent unintended unsealing by an external force. Such zipper tapes are not easily bent and, consequently, the disclosure of Patent Literature 1 cannot be easily applied.

In view of the above, an object of the invention is to provide a new and improved zipper-tape bag that is configured to be easily unsealed by a slide motion of both sides of the bag in a longitudinal direction of the zipper tape, and a manufacturing method of the zipper-tape bag.

Means for Solving the Problem(s)

A zipper-tape bag according to an aspect of the invention includes: a bag body including at least a pair of facing surfaces; and an elongated zipper tape whose cross sectional profile includes: first and second bases each bonded to corresponding one of the pair of facing surfaces; and mutually engageable first and second engagement portions respectively protruded from the first and second bases, in which at least one intermediate hinge is provided on at least one point of the zipper tape in a longitudinal direction.

According to the above aspect of the invention, even when the zipper tape is made of a highly rigid material and/or has a high engagement strength, the intermediate hinge facilitates the engagement portion of the zipper tape to be bent and disengaged. Accordingly, the bag can be easily unsealed by oppositely sliding the facing surfaces of the bag body along the longitudinal direction of the zipper tape.

In the above zipper-tape bag, the intermediate hinge optionally includes a thin portion or a cut provided to each of the first and second engagement portions.

The engagement portion, which has an irregular cross sectional profile in the zipper tape, can define the intermediate hinge by forming, for instance, the thin portion or the cut in the engagement portion.

In the above zipper-tape bag, the intermediate hinge optionally includes a punched hole penetrating through the first and second engagement portions and the first and second bases.

As described above, the intermediate hinge is not necessarily provided only in the engagement portion of the zipper tape but may also be formed in the base.

In the above zipper-tape bag, the at least one intermediate hinge optionally includes intermediate hinges provided on at least two points on the zipper tape in the longitudinal direction.

In this case, the at least one intermediate hinge is optionally provided on two points on the zipper tape equidistant from a midpoint of the zipper tape in the longitudinal direction.

According to the above arrangements, openings, which are created near the intermediate hinges when the engagement portion is bent, can be maximized, facilitating the unsealing of the zipper-tape bag.

In the above zipper-tape bag, an antislip structure is optionally provided on at least one of the pair of facing surfaces between the at least two points provided with the intermediate hinge. In the above zipper-tape bag, the antislip structure is optionally provided on at least one of the pair of facing surfaces between the at least one point provided with the intermediate hinge and corresponding one of ends of the zipper tape in the longitudinal direction.

According to the above arrangements, a friction coefficient between the surface of the bag body and a finger of a user can be increased, so that the unsealing operation using the finger of the user can be facilitated.

In the above zipper-tape bag, an engagement strength when the first and second engagement portions are mutually engaged is optionally 26 N/50 mm or more.

According to the above arrangement, the bag is not easily unsealed by a simple operation of separating both sides of the bag in a thickness direction of the zipper tape. Thus, while an unintended unsealing by, for instance, an external force is prevented, the bag can be easily unsealed when both sides of the bag are slid in the longitudinal direction of the zipper tape.

In the above zipper-tape bag, the zipper tape optionally defines a side of a housing space defined between the pair of facing surfaces, the first base is optionally bonded to one of the pair of facing surfaces both at a region near the housing space and a region opposite the housing space with respect to the first engagement portion, and the second base is optionally bonded to the other of the pair of facing surfaces at a region near the housing space with respect to the second engagement portion, and is optionally not bonded to the pair of facing surfaces at a region of the other of the pair of facing surfaces opposite the housing space with respect to the second engagement portion. In this case, a width of the region of the second base opposite the housing space with respect to the second engagement portion is optionally smaller than a width of the region of the first base opposite the housing space with respect to the second .engagement portion. Further, the width of the region of the second base opposite the housing space with respect to the second engagement portion is optionally 0.

According to the above arrangement, the bag is not easily unsealed by the simple operation of separating both sides of the bag in the thickness direction of the zipper tape irrespective of the engagement strength of the zipper tape. Thus, while an unintended unsealing by, for instance, an external force is prevented, the bag can be easily unsealed when both sides of the bag are slid in the longitudinal direction of the zipper tape.

A manufacturing method of a zipper-tape bag according to a second aspect of the invention includes: feeding an elongated zipper tape whose cross sectional profile includes: first and second bases; and mutually engageable first and second engagement portions respectively protruded from the first and second bases; bonding the first and second bases respectively on a pair of mutually facing films; and bonding the films with each other to form a bag body, in which the method further includes forming an intermediate hinge at least one point of the zipper tape in a longitudinal direction.

According to the above aspect of the invention, even when the zipper tape is made of a highly rigid material, the engagement portion of the zipper tape can be easily bent by the presence of the intermediate hinge. Accordingly, the bag can be easily unsealed by oppositely sliding the facing surfaces of the bag body along the longitudinal direction of the zipper tape.

In the above manufacturing method, the forming of the intermediate hinge is optionally performed between the feeding of the zipper tape and the bonding of the first and second bases onto the respective films.

According to the above arrangement, the intermediate hinge can be formed in the zipper tape without affecting the film of the bag body.

In the above manufacturing method, the forming of the intermediate hinge is optionally performed after the bonding of the first and second bases onto the respective films.

In this case, while the intermediate hinge is formed in the film of the bag body, a positioning accuracy of the intermediate hinge with respect to an end of the zipper tape can be improved.

As described above, according to the above aspects of the invention, the bag can be easily unsealed by sliding both sides of the bag along the longitudinal direction of the zipper tape.

BRIEF DESCRIPTION OF DRAWING(S)

DESCRIPTION OF EMBODIMENT(S)

Figure 1:
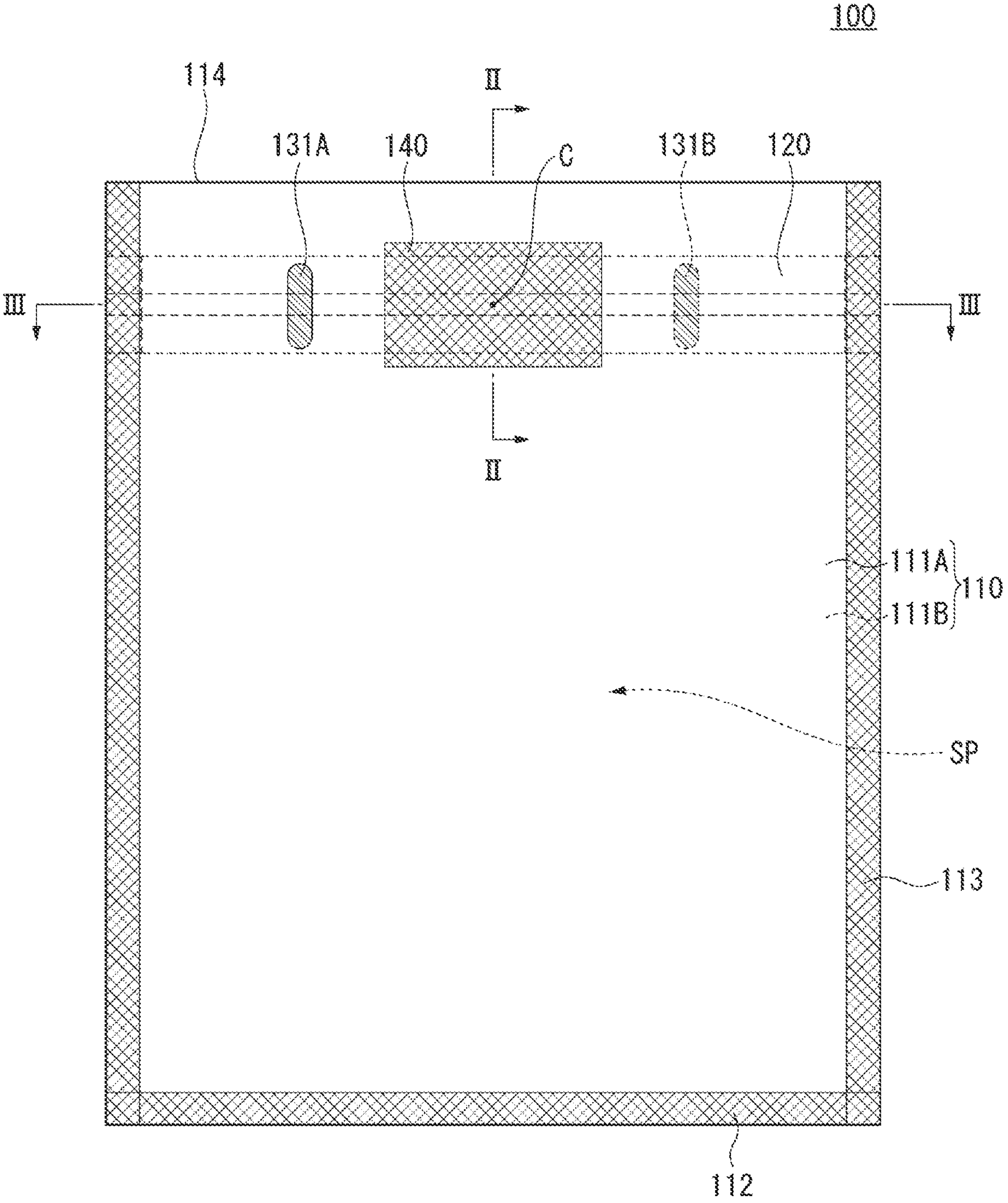
FIG. 1 is a plan view showing a zipper-tape bag according to a first exemplary embodiment of the invention.

Suitable exemplary embodiment(s) of the invention will be described in detail below with reference to attached drawings. It should be noted that the same reference numerals will be attached to components having substantially the same structures and functions to omit duplicated explanations therefor in the specification and drawings.

First Exemplary Embodiment

Figure 2:
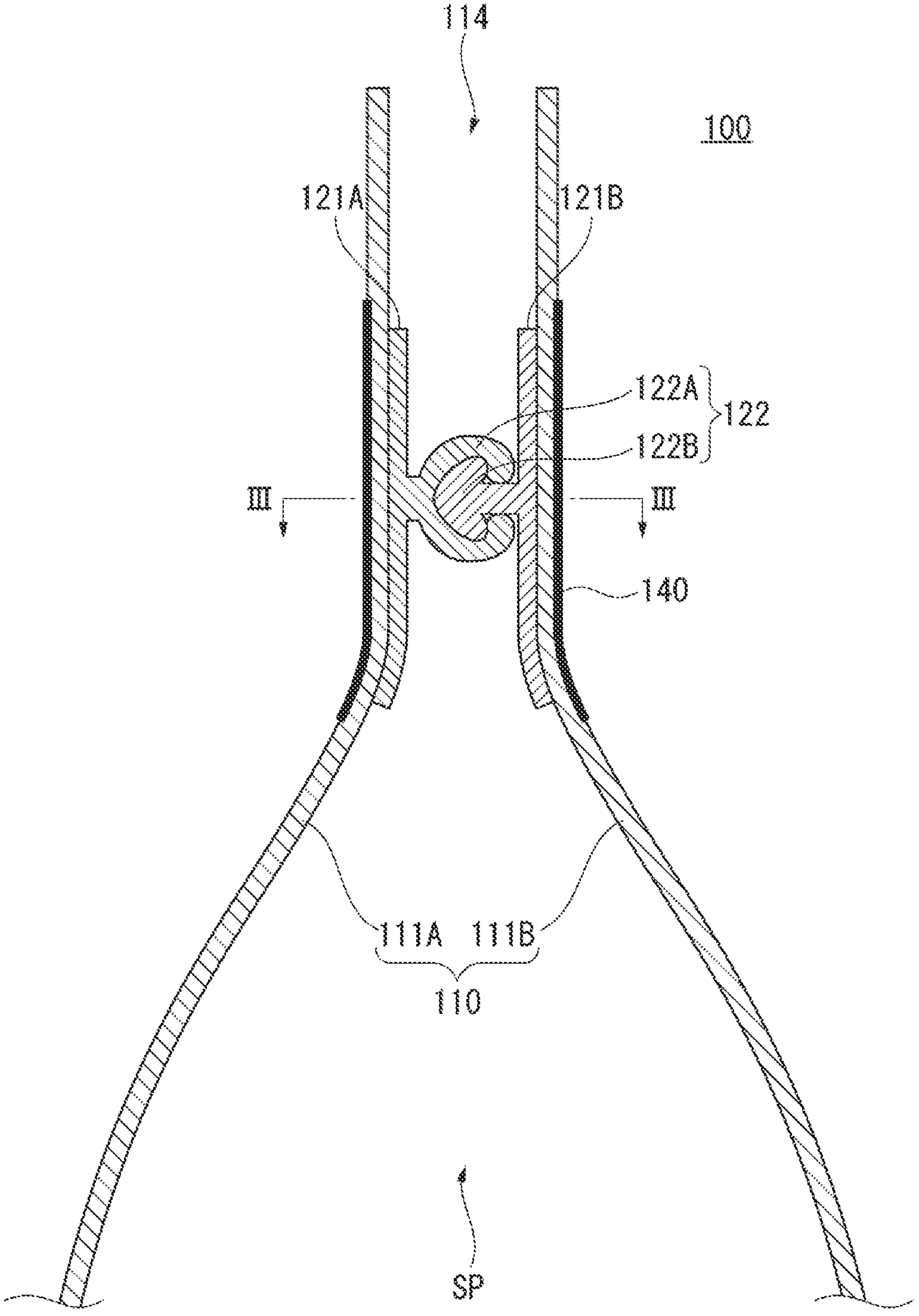
FIG. 2 is a cross-sectional view of the zipper-tape bag taken along II-II line shown in FIG. 1.

FIG. 1 is a plan view showing a zipper-tape bag according to a first exemplary embodiment of the invention. FIG. 2 is a cross-sectional view of the zipper-tape bag taken along II-II line shown in FIG. 1.

As shown in FIGS. 1 and 2, the zipper-tape bag 100 includes a film 110 that forms a bag body having a pair of facing surfaces 111A, 111B, and a zipper tape 120 bonded to the facing surfaces of the film 110. A housing space SP of the zipper-tape bag 100 is defined between the facing surfaces 111A, 111B of the film 110, the zipper tape 120 defining a side of the housing space SP. As shown in FIG. 2, the zipper tape 120 is an elongated member whose cross sectional profile has bases 121A, 121B respectively bonded to the facing surfaces 111A, 111B of the film 110, and a pair of mutually engageable engagement portions 122 (engagement portions 122A, 122B) respectively protruded from the bases 121A, 121B.

The film 110 is a single-layered or multi-layered film made of, for instance, a thermoplastic resin. More specifically, the film 110 may be made of an LDPE (Low-Density-PolyEthylene), LLDPE (Linear Low-Density PolyEthylene), or PP (PolyPropylene). PP may be HPP (Homo PolyPropylene), RPP (Random PolyPropylene), or BPP (Block PolyPropylene). When the film 110 is a multi-layered film, a top base material of the multi-layered film may be OPP (biaxially Oriented PolyPropylene), OPET (biaxially Oriented PolyEthylene Terephthalate), or ONy (biaxially Oriented Nylon). The film 110 may further include a layer of an inorganic material formed by vapor-depositing aluminum or layering an aluminum foil.

It should be noted that the facing surfaces 111A, 111B of the bag body, which are provided by mutually bonding two films 110 at a bottom seal portion 112 and side seal portions 113 in the first exemplary embodiment, may be provided by bending a single film 110 at a part corresponding to the side seal portion 113 in some exemplary embodiments. Further, a so-called gusset (i.e. an interfolded part of the film 110) may be formed at a part corresponding to the bottom seal portion 112 and/or side seal portions 113 in the example shown in FIG. 1. In this case, the gusset may be formed by the film 110 or may be formed using a separate film bonded to the film 110.

An opening 114 of the bag body in the first exemplary embodiment is formed by forming a seal portion at the bottom seal portion 112 and the side seal portions 113 and omitting the seal portion at a side of the bag body opposite the housing space SP with respect to the zipper tape 120. However, a top seal portion is provided in addition to the bottom seal portion and the side seal portions at the side of the bag body opposite the housing space SP with respect to the zipper tape in some other exemplary embodiments, the bag body being configured to be cut at a part between the top seal portion and the zipper tape to allow later formation of the opening in the bag body. In still other exemplary embodiments, the zipper-tape bag is optionally provided without forming the bottom seal portion located opposite with respect to the zipper tape. In this case, the bottom seal portion is provided after putting contents in the bag. The invention is applicable to zipper-tape bags of various known configurations in addition to the above.

The zipper tape 120 is made, for instance, through extrusion of a polyolefin resin. More specifically, the zipper tape 120 may be made of an LDPE (Low-Density-PolyEthylene), LLDPE (Linear Low-Density PolyEthylene), or PP (PolyPropylene). PP may be HPP (Homo PolyPropylene), RPP (Random PolyPropylene), or BPP (Block PolyPropylene). Known additives such as a stabilizer, antioxidant, lubricant, antistatic agent, and coloring agent may be added to the material of the zipper tape 120 as necessary.

It should be noted that an engagement portion 122A (first engagement portion) and an engagement portion 122B (second engagement portion) of the zipper tape 120, which are respectively a female engagement portion and a male engagement portion in the illustrated example, may alternatively be a male engagement portion and a female engagement portion, respectively. The cross sectional profiles of the engagement portions are not limited to those in the illustrated example but may have various known shapes. The engagement portions are not limited to the combination of the male and female members, but may be engagement portions having mutually facing hook-shaped cross sectional profiles. Further, though the illustrated zipper tape 120 includes the mutually engageable first and second engagement portions (engagement portions 122A, 122B), additional engagement portions (e.g. mutually engageable third and fourth engagement portions respectively protruded from the bases 121A, 121B) may be provided.

Figure 3:
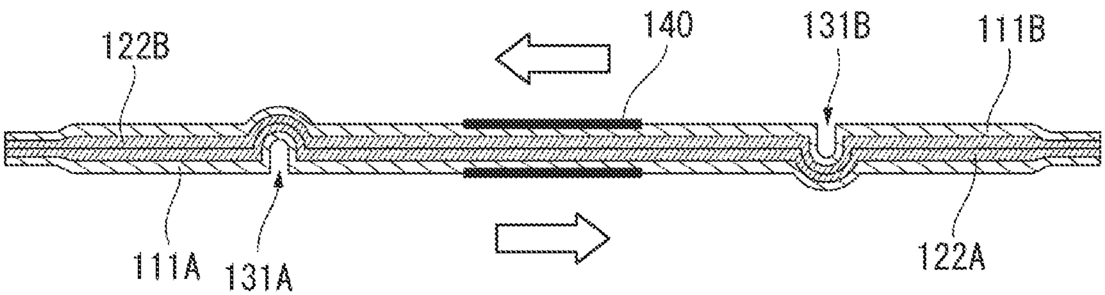
FIG. 3 is an illustration showing a thin portion formed in the zipper-tape bag of the exemplary embodiment and a function of the thin portion.
Figure 3:
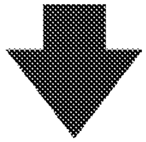
Figure 3:
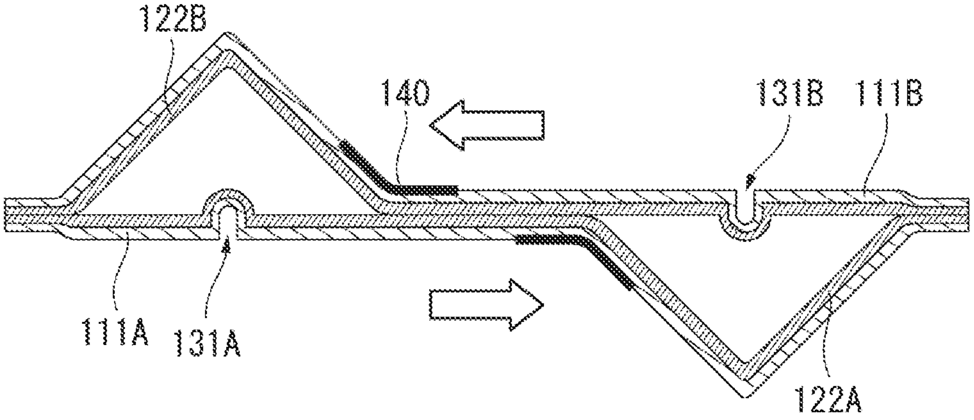

FIG. 3 is an illustration showing a thin portion formed in the zipper-tape bag of the first exemplary embodiment and a function of the thin portion. It should be noted that FIG. 3 is a cross-sectional view of the zipper-tape bag shown in FIGS. 1 and 2 taken along III-Ill line. As shown in FIGS. 1 and 3(A), thin portions 131A, 131B of the zipper-tape bag 100 according to the first exemplary embodiment are provided on parts of the zipper tape 120 including the engagement portion 122. The thin portions 131A, 131B are provided by, for instance, thinning the engagement portions 122A, 122B of the zipper tape 120 together with the bases 121A, 121B and the film 110 of the bag body through, for instance, later-described pressing process.

In the first exemplary embodiment, the engagement portions 122A, 122B having the irregular cross sectional profile in the zipper tape 120 are thinned, so that the thin portions 131A, 131B function as intermediate hinges of the zipper tape 120. Herein, the intermediate hinge refers to a point, at which a deflection angle of the zipper tape 120 becomes discontinuous because a bending moment is not transmitted or relatively weakened in a longitudinal direction of the zipper tape 120. Accordingly, the zipper tape 120 can be easily bent at the intermediate hinges. In the first exemplary embodiment, as shown in FIG. 3(A), the intermediate hinges in the form of the thin portions 131A, 131B are formed at two points in the longitudinal direction of the zipper tape 120. The two points provided with the thin portions 131A, 131B may be, for instance, equidistant with respect to a midpoint C of the zipper tape 120 in the longitudinal direction. In this case, the points provided with the thin portions 131A, 131B may each bisect a section between the midpoint C and corresponding one of ends of the zipper tape 120.

With the above-described thin portions 131A, 131B, when the facing surfaces 111A, 111B of the film 110 are oppositely slid at or near the center of the thin portions 131A, 131B along the longitudinal direction of the zipper tape 120 as shown in FIG. 3(B), the engagement portion 122B near the thin portion 131A is bent to be away from the engagement portion 122A and the engagement portion 122A near the thin portion 131B is bent to be away from the engagement portion 122B. Consequently, the engagement portion 122A and the engagement portion 122B are disengaged at the parts near the thin portions 131A, 131B. The zipper-tape bag 100 can be unsealed by, for instance, putting a finger(s) or the like into an opening created near each of the thin portions 131A, 131B and widening the opening to disengage the engagement portions 122A, 122B over the entire length of the zipper tape 120. With the above arrangement where the thin portions 131A, 131B are provided at the two points equidistant with respect to the midpoint C in the longitudinal direction of the zipper tape 120 and bisecting the sections between the midpoint C and the respective ends of the zipper tape 120, the opening created near the thin portions 131A, 131B when the engagement portions 122A, 122B are bent can be maximized, so that the zipper-tape bag 100 can be easily opened.

In order to facilitate the above-described unsealing operation using a finger of a user, an antislip structure 140 may be provided to the side of the facing surface 111A, 111B opposite the side bonded with the bases 121A, 121B, respectively, of the zipper tape 120 as shown in FIG. 1. The antislip structure 140 is, for instance, provided between the two points provided with the thin portions 131A, 131B as in the illustrated example. Alternatively, the antislip structure 140 may be provided, for instance, over the entire length of the zipper tape 120 including the thin portions 131A, 131B. The antislip structure 140 is specifically a part processed to increase an abrasion coefficient between the film 110 and the user's finger, which is provided by roughening, embossing, tackfying, or the like. It should be noted that the antislip structure 140, which is provided solely for assisting the unsealing operation as described above, may be provided, for instance, on only one of the facing surfaces 111A, 111B. Further, when the bag can be unsealed with the abrasion force of the film 110 per se, the antislip structure 140 is not necessarily provided.

According to the above-described first exemplary embodiment of the invention, the thin portions 131A, 131B, which are provided on the zipper tape 120 to serve as the intermediate hinges, facilitate the bending of at least one of the engagement portions 122A, 122B of the zipper tape 120 even when the zipper tape 120 is made of, for instance, a highly rigid material. Accordingly, the bag in the first exemplary embodiment can be easily unsealed by oppositely sliding the facing surfaces 111A, 111B of the film 110 forming the bag body along the longitudinal direction of the zipper tape 120.

Figure 4:
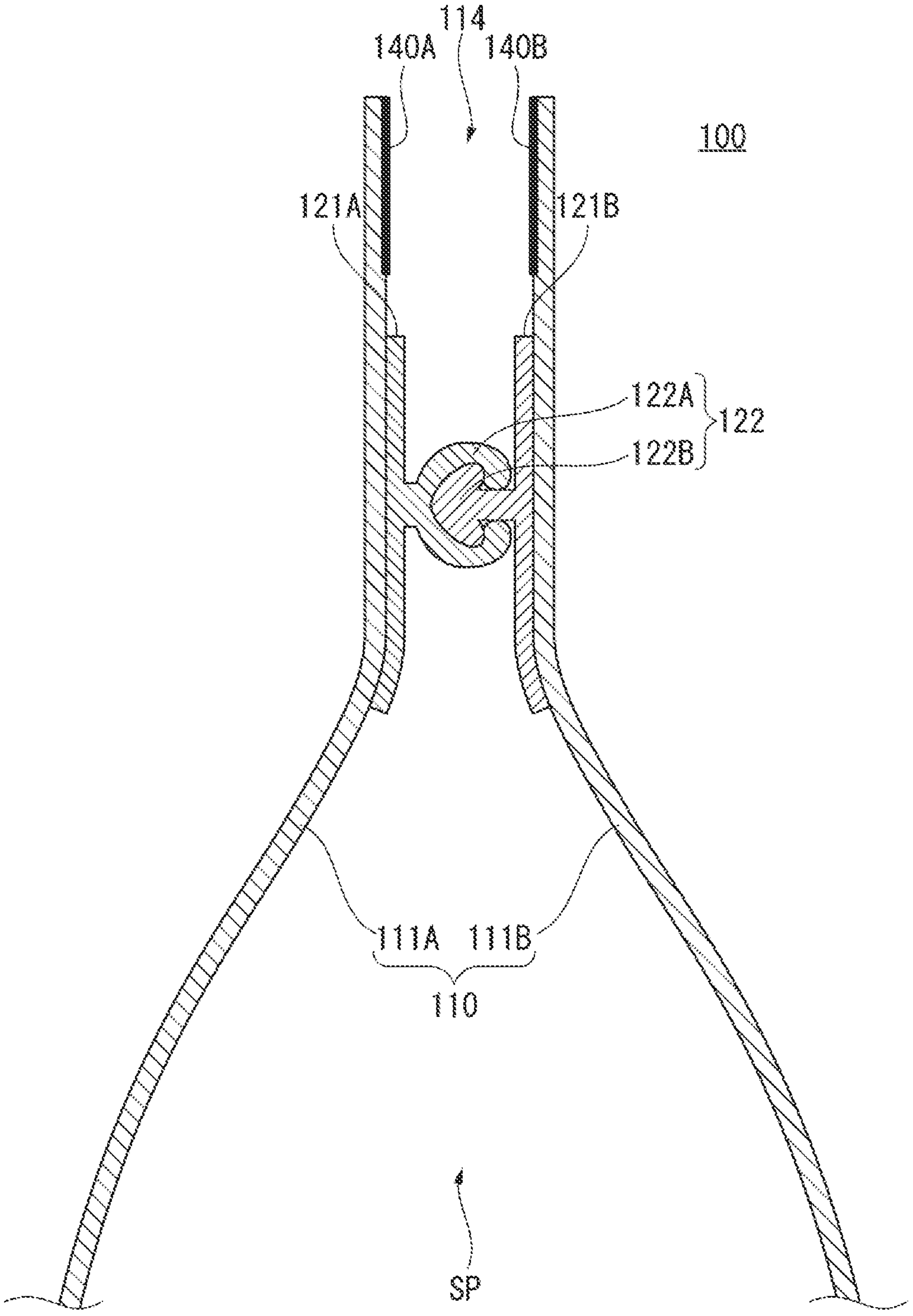
FIG. 4 is a cross-sectional view showing a modification of the bag according to the first exemplary embodiment of the invention.

FIG. 4 is a cross-sectional view showing a modification of the bag according to the first exemplary embodiment of the invention. In the illustrated modification, antislip structures 140A, 140B are provided on the sides of the facing surfaces 111A, 111B bonded with the bases 121A, 121B. More specifically, the antislip structure 140A is provided on the side of the facing surfaces 111A, 111B bonded with the bases 121A, 121B between the zipper tape 120 and the opening 114. In this case, the user pinches the antislip structures 140A, 140B with fingers of both hands and oppositely slides the facing surfaces 111A, 111B along the longitudinal direction of the zipper tape 120. Thus, the engagement portions 122A and 122B are disengaged by bending the engagement portions 122A, 122B near the thin portions 131A, 131B in the same manner as the example described with reference to FIG. 3.

The above-described antislip structures 140A, 140B are applicable, for instance, when the zipper tape 120 has a high engagement strength and is not easily unsealed only by a simple operation of separating the facing surfaces 111A, 111B in a thickness direction of the zipper tape 120. For instance, in order to prevent unintended unsealing by an external force for the purpose of childproofing or the like, the engagement strength when the engagement portions 122A, 122B of the zipper tape 120 are mutually engaged may be set at a level not easily unsealed by the above-described simple operation (specifically, 26 N/50 mm or more, preferably 30 N/50 mm or more, more preferably 40 N/50 mm or more) and the bag can be unsealed by oppositely sliding the facing surfaces 111A, 111B along the longitudinal direction of the zipper tape 120. The maximum value of the engagement strength is, for instance, approximately 200 N/50 mm. It should be noted that the antislip structures 140A, 140B, which are also provided solely for assisting the unsealing operation, may be provided, for instance, on only one of the facing surfaces 111A, 111B or may be not provided. The engagement strength herein can be measured as follows using, for instance, a digital force gauge (manufactured by IMADA CO., LTD.). Initially, the zipper tape is cut in the longitudinal direction in a length of 50 mm. Then, the male base 121B and the female base 121A of the zipper tape are each held at a part 2 mm apart from the engagement portion. Subsequently, while the female base 121A is fixed, the male base 121B is raised until the engagement portions 122A, 122B are disengaged. The strength of the force applied when the engagement portions 122A, 122B are disengaged is measured and the measurements at the maximum load is defined as the engagement strength. When the length in the longitudinal direction is less than 50 mm, denoting the length as X mm, measurements N/X mm can be converted to N/50 mm by multiplying the measurements by 50/X.

Second Exemplary Embodiment

Figure 5:
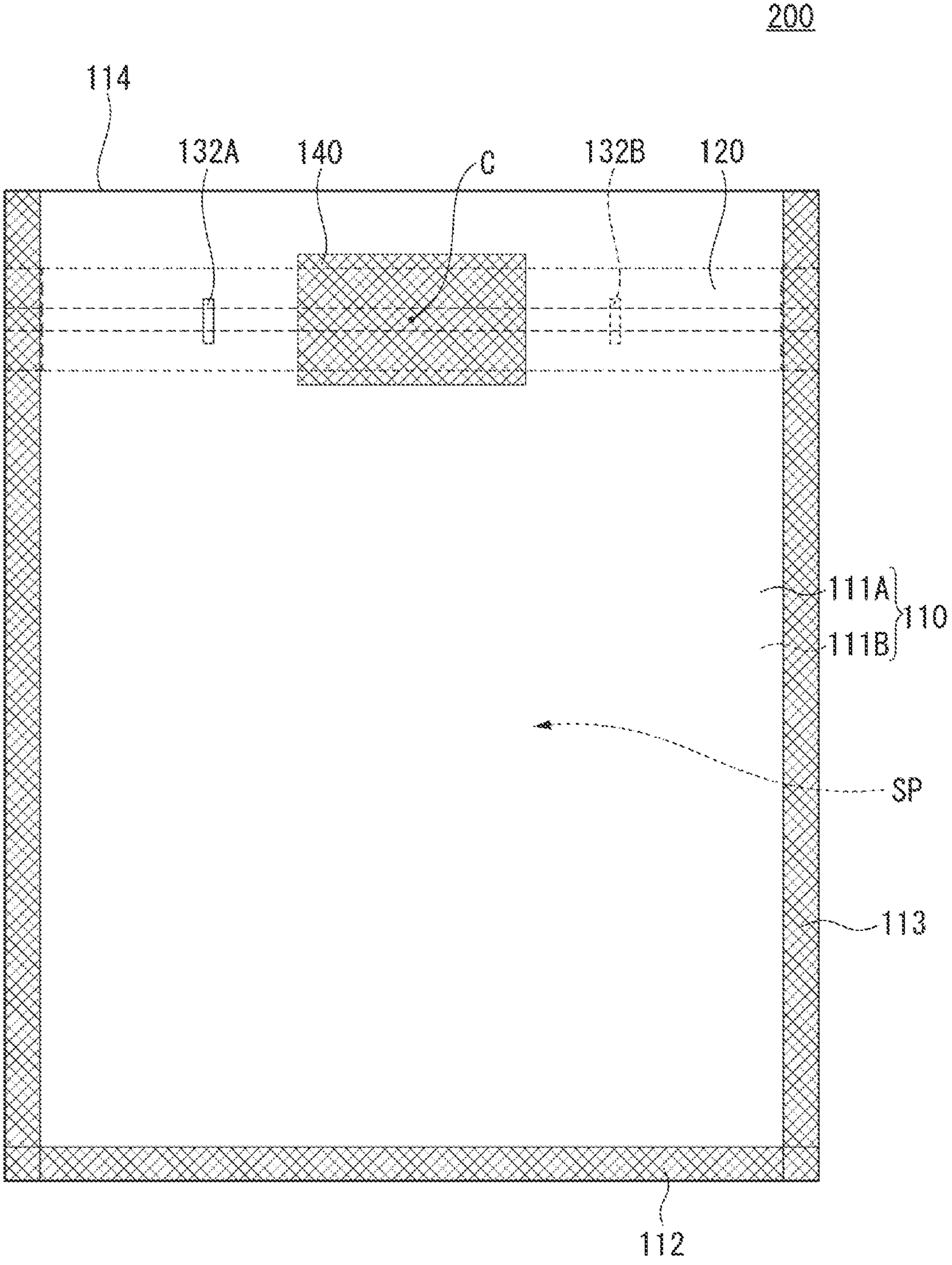
FIG. 5 is a plan view showing a zipper-tape bag according to a second exemplary embodiment of the invention.

FIG. 5 is a plan view showing a zipper-tape bag according to a second exemplary embodiment of the invention. As illustrated, a zipper-tape bag 200 according to the second exemplary embodiment includes cuts 132A, 132B provided on parts of the zipper tape 120 including the engagement portion 122. In the illustrated example, the cuts 132A, 132B are provided on respective sides of the zipper-tape bag 200. Specifically, the cut 132A is provided from the facing surface 111A of the film 110 into the base 121A and engagement portions 122A, 122B of the zipper tape 120. The cut 132B is provided from the facing surface 111B of the film 110 into the base 121B and the engagement portions 122A, 122B of the zipper tape 120. It should be noted that the components of the zipper-tape bag 200 other than those described above are the same as those in the zipper-tape bag 100 in the above-described first exemplary embodiment. Further, the modifications of the first exemplary embodiment are also applicable to the second exemplary embodiment.

In the second exemplary embodiment, the cuts 132A, 132B, which reach the engagement portions 122A, 122B having irregular cross sectional profiles in the zipper tape 120, function as the intermediate hinges of the zipper tape 120. As already described in the first exemplary embodiment, the zipper tape 120 can be easily bent at the intermediate hinges. In the same manner as the intermediate hinges of the first exemplary embodiment, the cuts 132A, 132B are provided at two points spaced in the longitudinal direction of the zipper tape 120, the two points being optionally equidistant with respect to the midpoint C of the zipper tape 120 in the longitudinal direction. Further, the points provided with the cuts 132A, 132B may each bisect a section between the midpoint C and corresponding one of the ends of the zipper tape 120.

According to the above-described second exemplary embodiment of the invention, in the same manner as the first exemplary embodiment, the cuts 132A, 132B, which are provided on the zipper tape 120 to serve as the intermediate hinges, facilitate the bending of at least one of the engagement portions 122A, 122B of the zipper tape 120 even when the zipper tape 120 is made of, for instance, a highly rigid material. Accordingly, the bag in the second exemplary embodiment can also be easily unsealed by oppositely sliding the facing surfaces 111A, 111B of the film 110 defining the bag body along the longitudinal direction of the zipper tape 120.

Third Exemplary Embodiment

Figure 6:
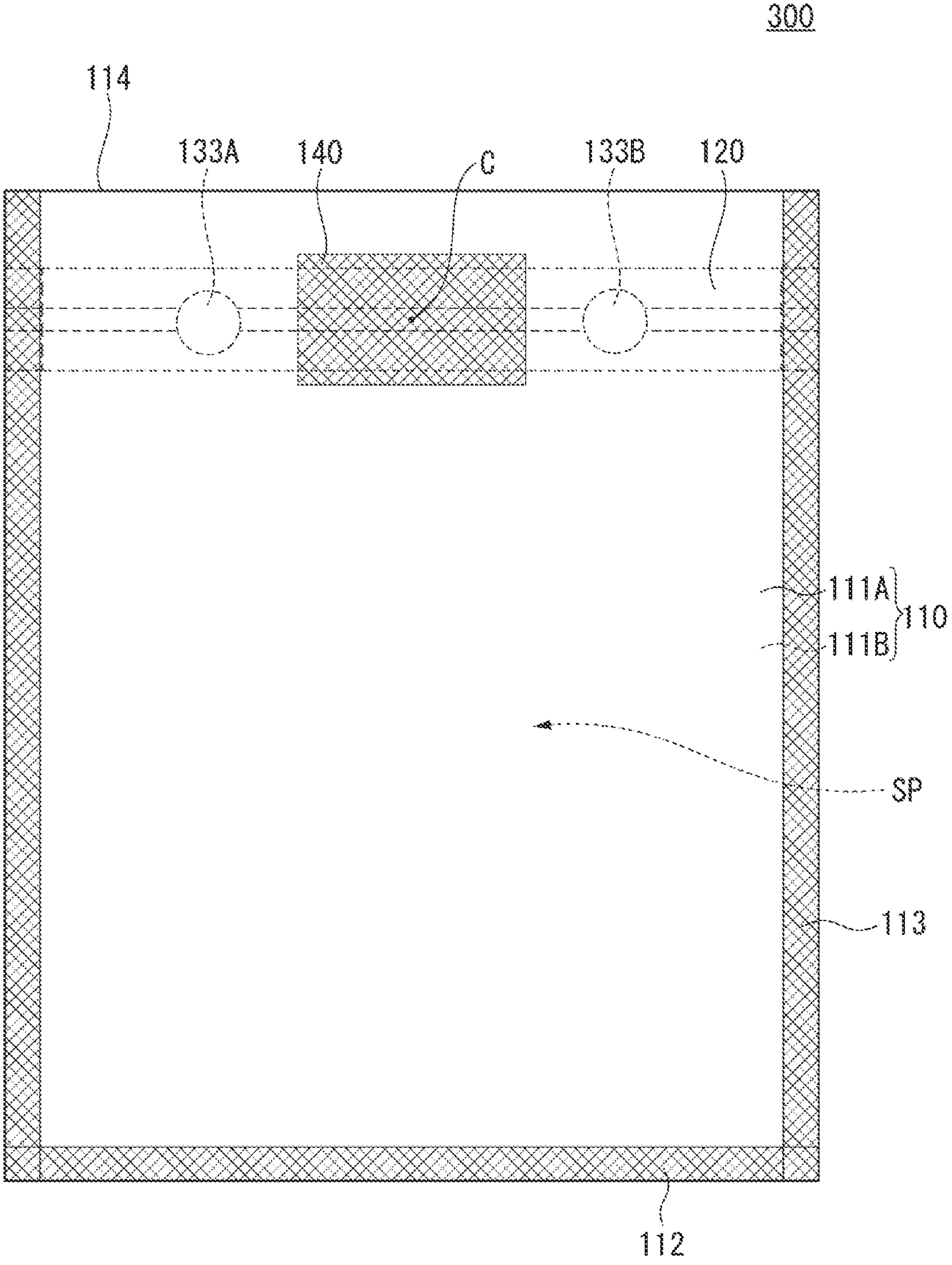
FIG. 6 is a plan view showing a zipper-tape bag according to a third exemplary embodiment of the invention.

FIG. 6 is a plan view showing a zipper-tape bag according to a third exemplary embodiment of the invention. As illustrated, a zipper-tape bag 300 according to the third exemplary embodiment includes punched holes 133A, 133B formed in parts of the zipper tape 120 provided with the engagement portion 122. In the illustrated example, the punched holes 133A, 133B each penetrate through the zipper tape 120. Specifically, the punched holes 133A, 133B, which are provided, for instance, before the zipper tape 120 is bonded to the film 110 as described later, penetrate through the base 121A, the engagement portions 122A, 122B, and the base 121B of the zipper tape 120. It should be noted that the components of the zipper-tape bag 300 other than those described above are the same as those in the zipper-tape bag 100 in the above-described first exemplary embodiment. Further, the modifications of the first exemplary embodiment are also applicable to the third exemplary embodiment.

In the third exemplary embodiment, the punched holes 133A, 133B, which penetrate through the engagement portions 122A, 122B having irregular cross sectional profiles in the zipper tape 120, function as the intermediate hinges of the zipper tape 120. As already described in the first exemplary embodiment, the zipper tape 120 can be easily bent at the intermediate hinges. In the same manner as the intermediate hinges of the first exemplary embodiment, the punched holes 133A, 133B are provided at two points spaced in the longitudinal direction of the zipper tape 120, the two points being optionally equidistant with respect to the midpoint C of the zipper tape 120 in the longitudinal direction. Further, the points provided with the punched holes 133A, 133B may each bisect a section between the midpoint C and corresponding one of the ends of the zipper tape 120.

According to the above-described third exemplary embodiment of the invention, in the same manner as the first exemplary embodiment, the punched holes 133A, 133B, which are provided on the zipper tape 120 to serve as the intermediate hinges, facilitate the bending of at least one of the engagement portions 122A, 122B of the zipper tape 120 even when the zipper tape 120 is made of, for instance, a highly rigid material. Accordingly, the bag in the third exemplary embodiment can also be easily unsealed by oppositely sliding the facing surfaces 111A, 111B of the film 110 forming the bag body along the longitudinal direction of the zipper tape 120.

Fourth Exemplary Embodiment

Figure 7:
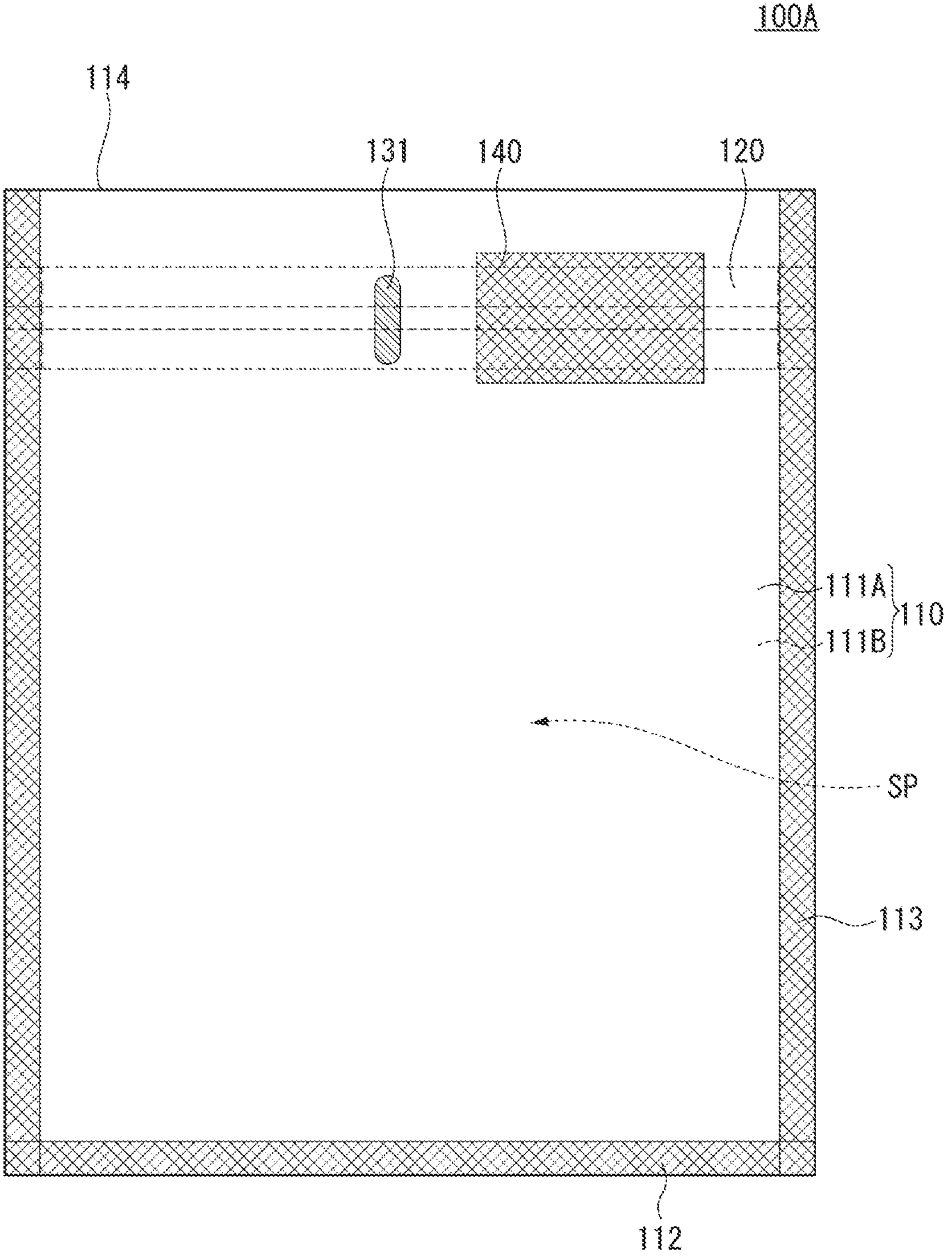
FIG. 7 is a plan view showing a zipper-tape bag according to a fourth exemplary embodiment of the invention.

FIG. 7 is a plan view showing a zipper-tape bag according to a fourth exemplary embodiment of the invention. As illustrated, a zipper-tape bag 100A according to the fourth exemplary embodiment includes the same thin portion 131 as that in the first exemplary embodiment, the thin portion 131 being provided at a single point of the zipper tape 120 in the longitudinal direction. In the above arrangement, the antislip structure 140 is formed at a part between the point provided with the thin portion 131 and an end of the zipper tape 120 in the longitudinal direction (i.e. a part at which the zipper tape 120 intersects corresponding one of the side seal portions 113). In the fourth exemplary embodiment, the thin portion 131 functions as the intermediate hinge of the zipper tape 120. Accordingly, the cut in the second exemplary embodiment or the punched hole in the third exemplary embodiment may be provided instead of the thin portion 131. It should be noted that the components of the zipper-tape bag 100A other than those described above are the same as those in the zipper-tape bag 100 in the above-described first exemplary embodiment. Further, the modifications of the first exemplary embodiment are also applicable to the fourth exemplary embodiment.

In the fourth exemplary embodiment, when a user, for instance, pinches a part near the antislip structure 140 and oppositely slides the facing surfaces 111A, 111B of the film 110 in the longitudinal direction of the zipper tape 120, the engagement portion 122A near the thin portion 131 is bent away from the engagement portion 122B to be disengaged (see FIG. 2 for the engagement portions 122A, 122B). The processes for putting finger(s) or the like into the disengaged portion and unsealing the zipper-tape bag 100 by widening the disengaged portion are the same as those described in the first exemplary embodiment. It should be noted that the relationship between the engagement portions 122A, 122B during the above unsealing operation is interchangeable.

As described in the above fourth exemplary embodiment, the number of the intermediate hinge provided to the zipper tape is not necessarily two in the exemplary embodiment of the invention. One intermediate hinge or more than two intermediate hinges may be provided.

Fifth Exemplary Embodiment

Figure 8:
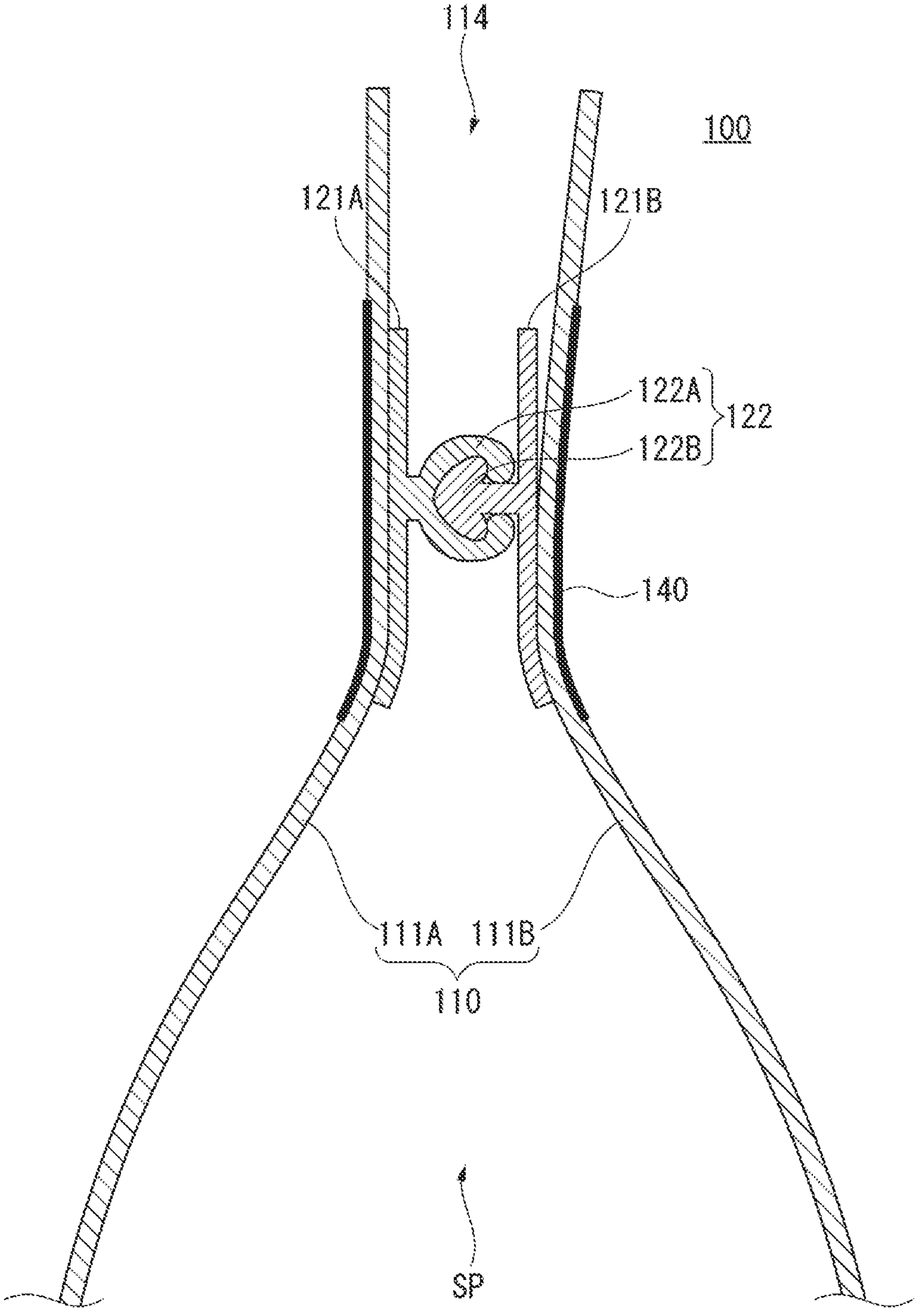
FIG. 8 is a cross-sectional view showing a zipper-tape bag according to a fifth exemplary embodiment of the invention.
Figure 9:
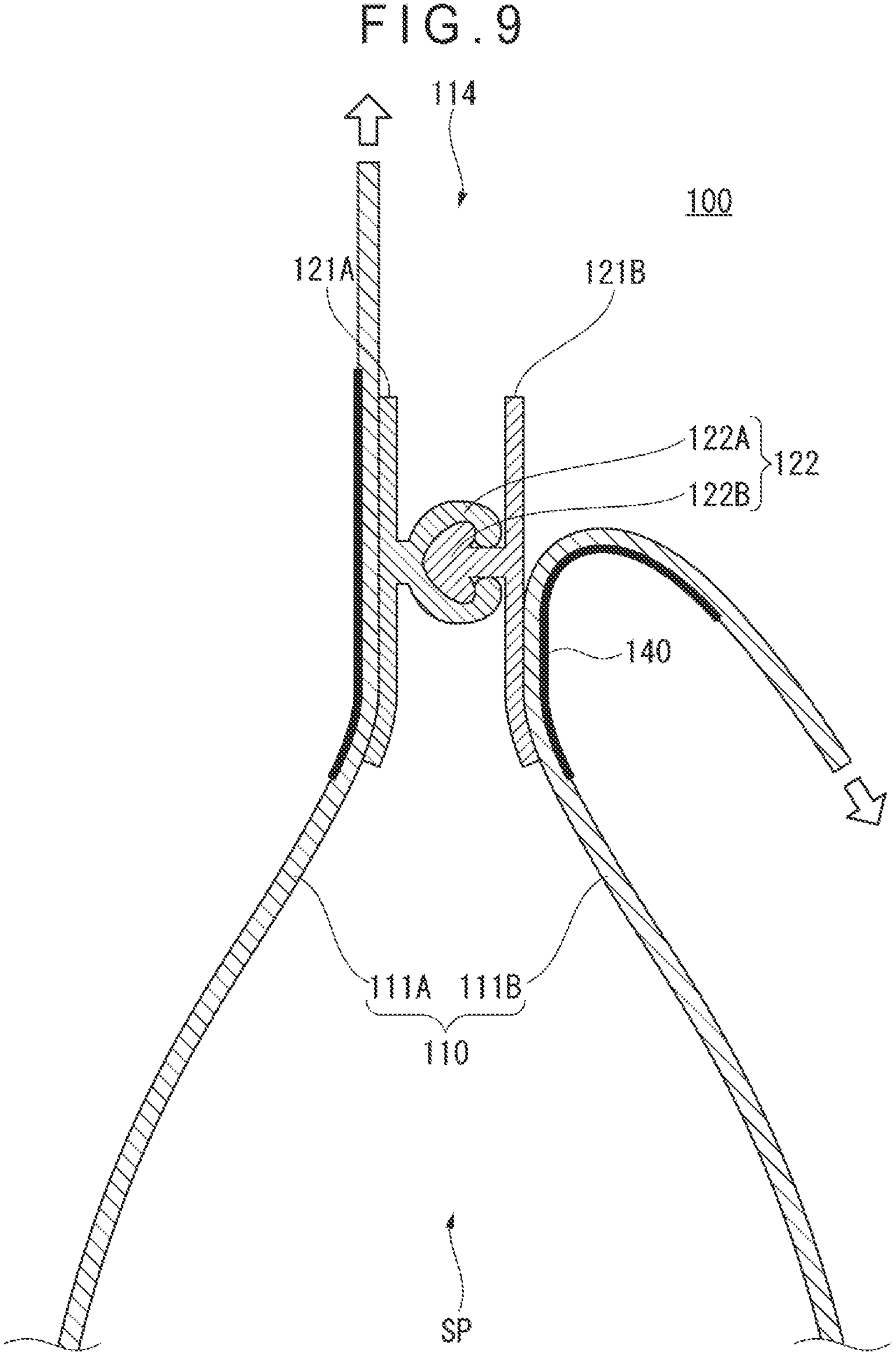
FIG. 9 is an illustration showing an unintended-unsealing-prevention function of the zipper-tape bag shown in FIG. 8.

FIG. 8 is a cross-sectional view of a zipper-tape bag according to a fifth exemplary embodiment of the invention. FIG. 9 is an illustration showing an unintended-unsealing-prevention function of the zipper-tape bag shown in FIG. 8. It should be noted that FIGS. 8 and 9, which correspond to FIG. 2 for the first exemplary embodiment, do not show the intermediate hinge provided to the zipper tape 120. However, the intermediate hinge(s) similar to the intermediate hinges described in one of the above first to fourth exemplary embodiments is provided to the zipper tape 120 in the fifth exemplary embodiment. It should be noted that the components of the zipper-tape bag 100 other than those described above are the same as those in the zipper-tape bag in the above-described first exemplary embodiment. Further, the modifications of the first exemplary embodiment are also applicable to the fifth exemplary embodiment.

As illustrated, in the fifth exemplary embodiment, while the base 121A (first base) of the zipper tape 120 is bonded to the facing surface 111A at a region near the housing space SP and a region near the opening 114 (i.e. opposite the housing space SP) with respect to the engagement portion 122A (first engagement portion), the base 121B (second base), which is bonded to the facing surface 111B at a region near the housing space SP with respect to the engagement portion 122B (second engagement portion), is not bonded to the facing surface 111B at a region near the opening 114 with respect to the engagement portion 122B.

Thus, in the fifth exemplary embodiment, when the bag is to be unsealed through a simple operation of pinching the parts of the facing surfaces 111A, 111B near the opening 114 and separating the parts away from each other in the thickness direction of the zipper tape 120, the force is not applied on the part of the base 121B near the opening 114 that is not bonded to the facing surface 111B, as shown in FIG. 9. As a result, most of the force functions as a shear force acting in the width direction of the zipper tape 120, so that the force for separating the engagement portions 122A, 122B in the thickness direction of the zipper tape 120 is reduced. Consequently, the zipper-tape bag 100 is not easily unsealed with the above simple operation.

The above arrangement for preventing easy unsealing of the zipper-tape bag 100 with the above simple operation is employed for the purpose of preventing unintended unsealing by an external force (e.g. childproofing). In order to intentionally unseal the zipper-tape bag 100, as described above with reference to FIG. 3 and the like, the facing surfaces 111A, 111B are oppositely slid along the longitudinal direction of the zipper tape 120.

Figure 10:
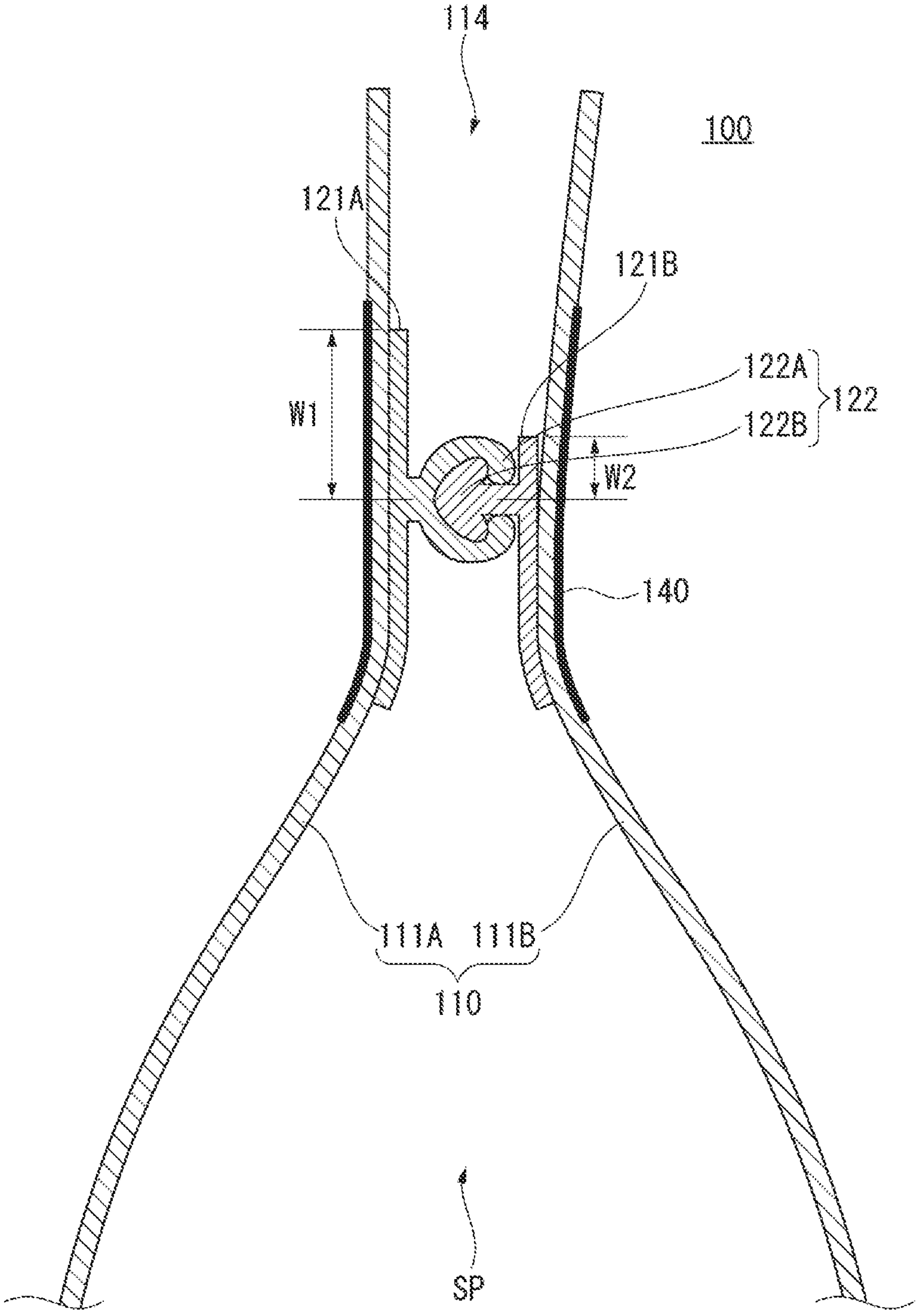
FIG. 10 is a cross-sectional view showing a modification of the fifth exemplary embodiment of the invention.

FIG. 10 is a cross-sectional view showing a modification of the bag according to the fifth exemplary embodiment of the invention. In the illustrated example, the base 121B (second base), which is not bonded to the facing surface 111B at the part near the opening 114 with respect to the engagement portion 122B (second engagement portion) as in the above exemplary embodiments, additionally has a width W2 at a part near the opening 114 with respect to the engagement portion 122B, the width W2 being smaller than a width W1 of the base 121A (first base) at a part near the opening 114 with respect to the engagement portion 122A (first engagement portion). It should be noted that the widths W1, W2 in the illustrated example are defined with reference to respective centers of the engagement portions 122A, 122B in the width direction. In this case, the zipper-tape bag 100 is not easily unsealed even when the parts of the facing surfaces 111A, 111B near the opening 114 are pinched as in the above-described example. In addition, since the part of the base 121B near the opening 114, whose width is small, is difficult to be pinched for unsealing the zipper-tape bag 100, the unintended unsealing by an external force can be effectively prevented. More specifically, the width of the part of the base 121B near the opening 114 is, for instance, preferably 3 mm or less, more preferably 2 mm or less, further preferably 1 mm or less. The lower limit is 0 mm, whose example will be described later.

Figure 11:
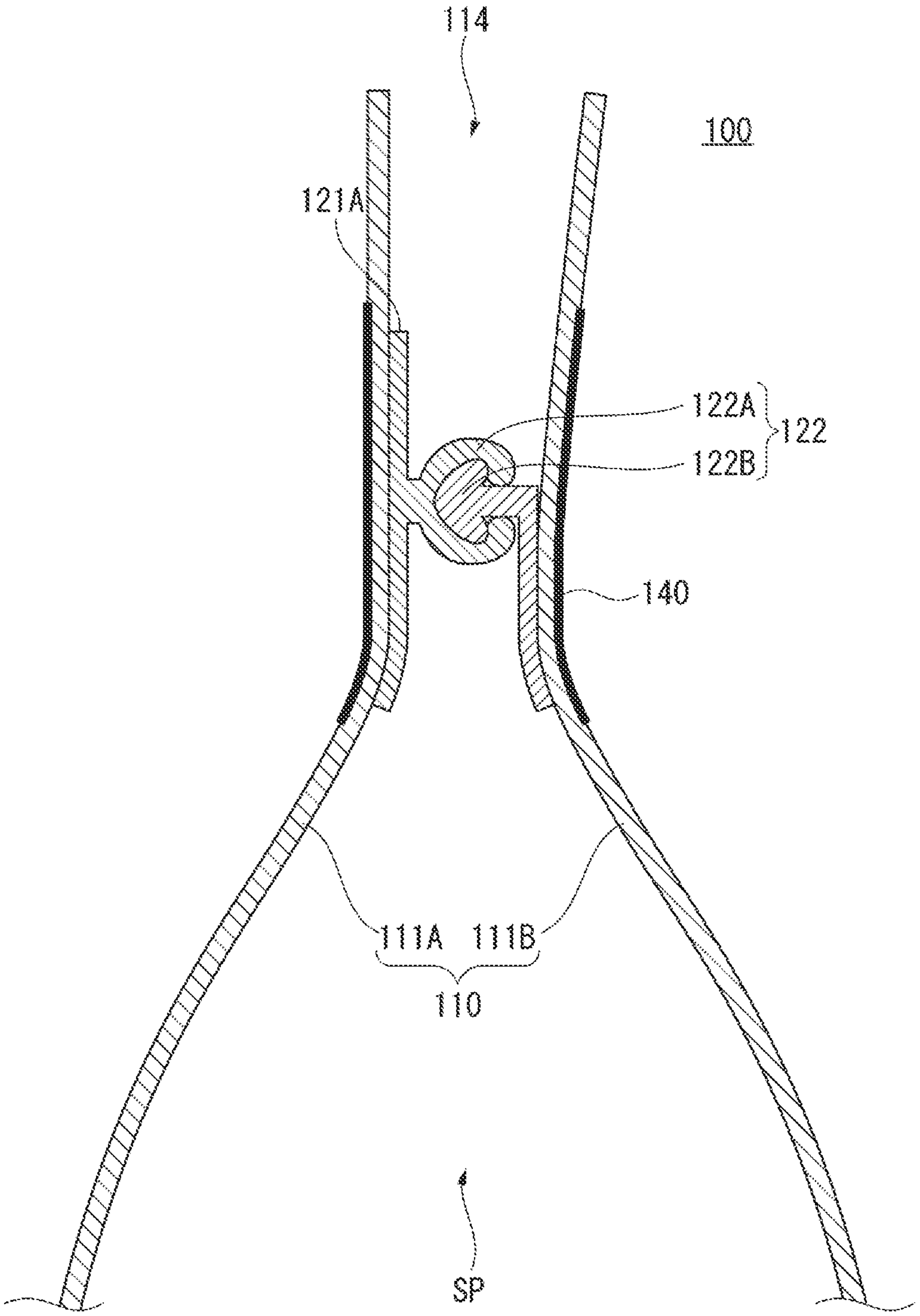
FIG. 11 is a cross-sectional view showing another modification of the fifth exemplary embodiment of the invention.

FIG. 11 is a cross-sectional view showing another modification of the bag according to the fifth exemplary embodiment of the invention. In the illustrated example, the width of the part of the base 121B (second base) near the opening 114 with respect to the engagement portion 122B (second engagement portion) is 0. In other words, in this example, the base 121B is not present at a part near the opening 114 beyond the part from which the engagement portion 122B is protruded. As a result, the base 121B (second base) is not bonded to the facing surface 111B at the part near the opening 114 with respect to the engagement portion 122B (second engagement portion). In this case, the zipper-tape bag 100 is not easily unsealed even when the parts of the facing surfaces 111A, 111B near the opening 114 are pinched as in the above-described example. In addition, the absence of the part of the base 121B near the opening 114 makes it substantially impossible to pinch the part for unsealing the zipper-tape bag 100, thereby further effectively preventing the unintended unsealing by an external force.

It should be noted that the fifth exemplary embodiment can be modified as desired with reference to conventional arts such as JP 2015-116269 A, JP 2015-217980 A, US Patent Application Publication No. 2014/0161374 and the like, which disclose the use of the arrangements of the zipper tape 120 as described above with reference to FIGS. 8 to 11 in order to prevent the unintended unsealing caused by an external force. Specifically, a plurality of pairs of engagement portions may be provided, the disposition of the male and female engagement portions may be reversed from the illustrated example, and/or engagement portions having mutually facing hook-shaped cross sectional profiles may be used.

In the above conventional arts, since it is not easy to pinch the parts of the facing surfaces 111A, 111B near the opening 114 for unsealing, an additional unsealing arrangement for intended unsealing is used, where, for instance, the film 110 is cut at a part near the housing space SP with respect to the zipper tape 120, or the part of the base 121B near the opening 114, if present, is pinched. In contrast, with the aid of the intermediate hinge (e.g. the thin portion in the first exemplary embodiment) provided on the zipper tape 120, the zipper-tape bag 100 in the fifth exemplary embodiment can be unsealed by the oppositely sliding operation of the facing surfaces 111A, 111B along the longitudinal direction of the zipper tape 120. Accordingly, in the fifth exemplary embodiment, the zipper-tape bag 100 can be re-sealed using the zipper tape 120 even after the zipper-tape bag 100 is intentionally unsealed. Further, it is not necessary that the part of the base 121B near the opening 114 is pinchable.

Manufacturing Method of Zipper-Tape Bag

Figure 12:
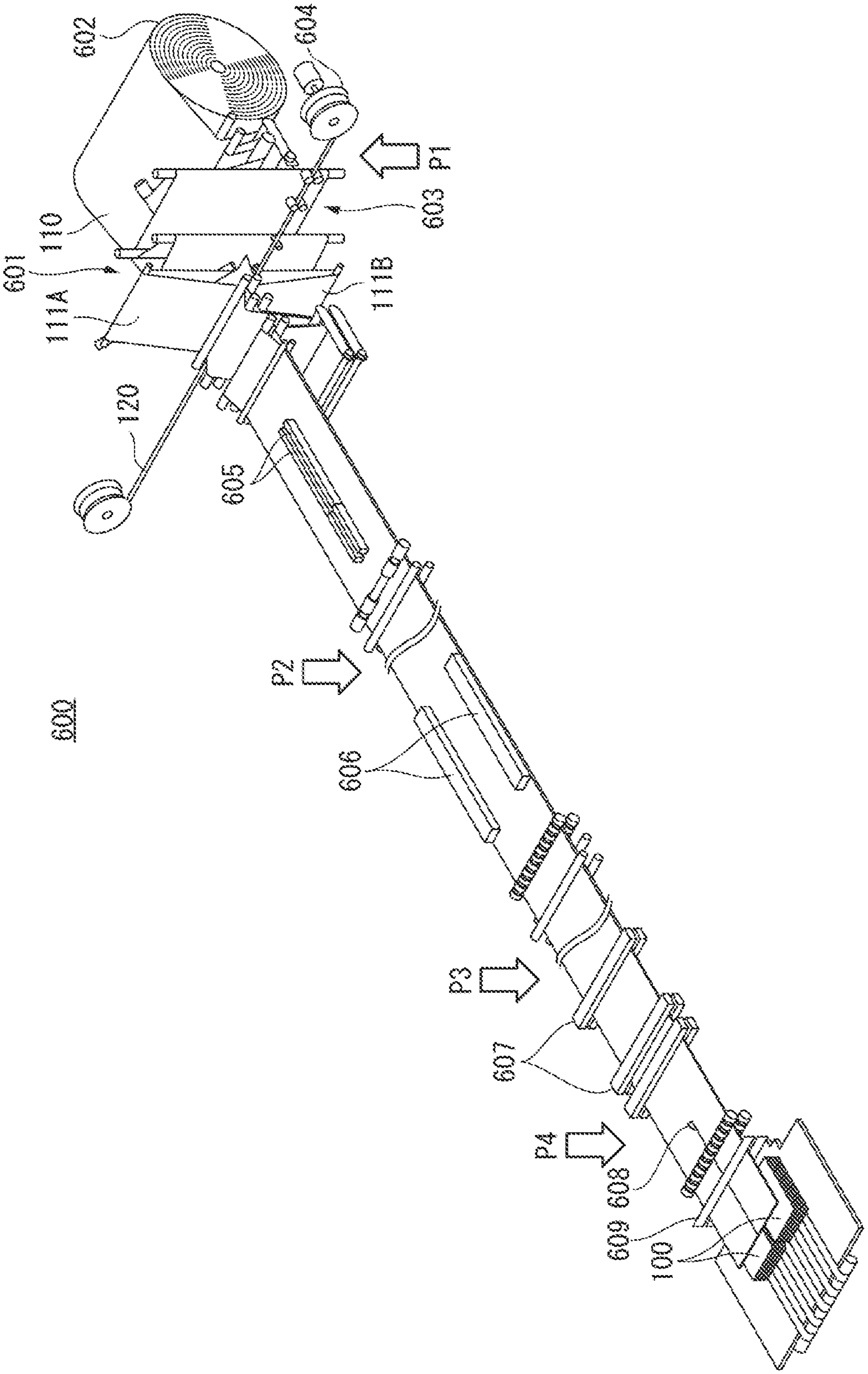
FIG. 12 is a perspective view showing a three-side-seal bag-making machine for manufacturing the zipper-tape bag according to the exemplary embodiments of the invention.

FIG. 12 is a perspective view showing a three-side-seal bag-making machine for manufacturing the zipper-tape bag according to the exemplary embodiments of the invention. As shown in FIG. 12, a three-side-seal bag-making machine 600 includes a film feeder 601 configured to feed the film 110 wound around a film roll 602, and a cutting blade (not shown) for cutting the film 110 in a width direction to form a pair of mutually facing portions (facing surfaces 111A, 111B). Meanwhile, a tape feeder 603, which is configured to feed the zipper tape 120 wound around a tape roll 604, feeds the zipper tape 120 using a guide member (not shown) to a predetermined position between the facing surfaces 111A, 111B of the film 110. A seal bar 605 is configured to bond the bases 121A, 121B of the zipper tape 120 to the facing surfaces 111A, 111B of the film 110, respectively. Heat-sealing, ultrasonic welding, adhering using an adhesive or the like is used for bonding the bases to the facing surfaces.

The bottom seal portion 112 is formed on the film 110 bonded with the zipper tape 120 at a part between the facing surfaces 111A, 111B using a seal bar 606. Similarly, the side seal portions 113 are provided using seal bars 607. The zipper-tape bag 100 according to the above-described first exemplary embodiment is manufactured after being cut by a cutting blade 608 for cutting the film 110 in the longitudinal direction, and a cutting blade 609 for cutting the film 110 in the width direction. The same process applies to the zipper-tape bags according to the second to fifth exemplary embodiments.

It should be noted that a device for providing the intermediate hinges (e.g. the thin portions 131A, 131B, the cuts 132A, 132B, or the punched holes 133A, 133B) to the zipper tape 120 is not shown in FIG. 12. The device for providing the intermediate hinges is disposed at, for instance, at least one of sections indicated in FIG. 12 by arrows P1 to P4. The arrow P1 points to a section between a step for feeding the zipper tape 120 by the tape feeder 603 and a step for bonding the bases 121A, 121B of the zipper tape 120 by the seal bar 605 on the facing surfaces 111A, 111B of the film 110. The arrow P2 points to a section after the step for bonding the bases 121A, 121B of the zipper tape 120 to the facing surfaces 111A, 111B of the film 110 and before a step for mutually bonding the facing surfaces 111A, 111B of the film 110 to form the bag body. The arrow P3 points to a section during the step for mutually bonding the facing surfaces 111A, 111B of the film 110 to form the bag body. The arrow P4 points to a section after the step for forming the bag body.

Figure 13:
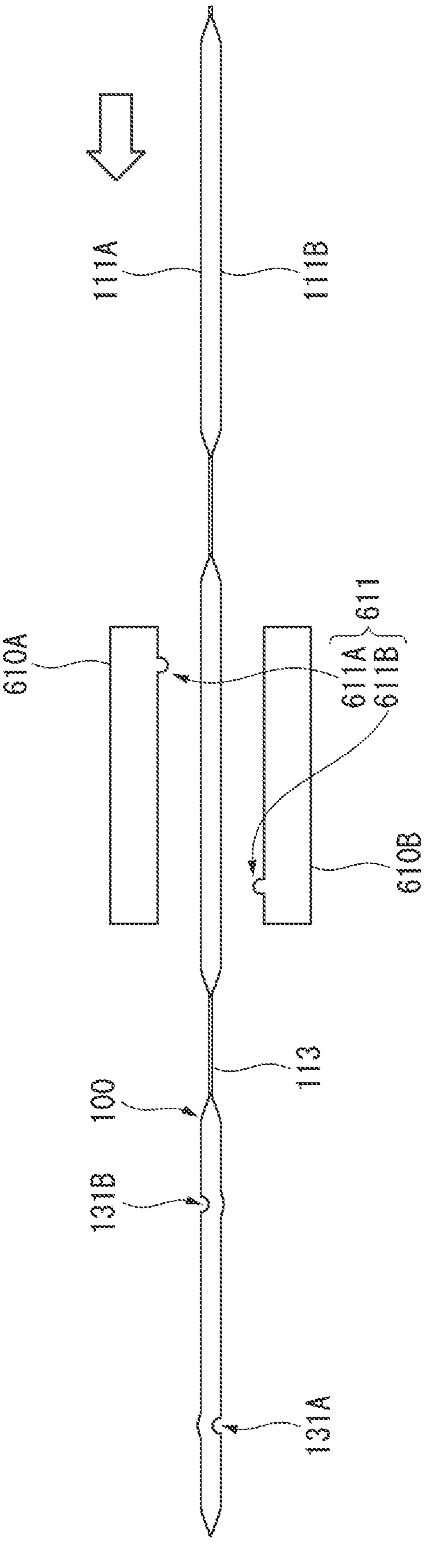
FIG. 13 is an illustration showing an exemplary device for forming an intermediate hinge in the zipper-tape according to the exemplary embodiments of the invention.

FIG. 13 is an illustration showing an exemplary device for forming the intermediate hinge in the zipper-tape according to the exemplary embodiments of the invention. In the illustrated example, in the section indicated by the arrow P4 shown in FIG. 12 (i.e. the section after the side seal portions 113 are formed between the facing surfaces 111A, 111B of the film 110), pressing members 610A, 610B each having a protrusion 611 (protrusions 611A, 611B) are used to press both sides of the facing surfaces 111A, 111B to form the thin portions 131A, 131B of the zipper-tape bag 100 according to the first exemplary embodiment. Through the pressing process, the engagement portion 122 of the zipper tape 120 can be thinned while retaining the shape thereof, thereby forming the thin portions 131A, 131B without impairing the sealing performance of the zipper tape 120.

In the above example, the protrusion 611 is used to form the thin portions 131A, 131B. In contrast, a cutting blade may be provided in place of the protrusion 611 to form the cuts 132A, 132B of the zipper-tape bag 200 according to the second exemplary embodiment. Further, with a punching unit provided in place of the protrusion 611 and a die hole of a shape corresponding to the punching unit provided at a position facing the punching unit, the punched holes 133A, 133B of the zipper-tape bag 300 according to the third exemplary embodiment can be formed. It should be noted that, though the thin portion 131A is formed by pressing from the side of the facing surface 111A and the thin portion 131B is formed by pressing from the side of the facing surface 111B in the illustrated example, both of the thin portions 131A, 131B may be formed by pressing from only one of or both of the sides of the facing surface 111A and the facing surface 111B.

Further, though the intermediate hinge(s) is formed in the zipper tape 120 at the section indicated by the arrow P4 shown in FIG. 12 in the above example, the intermediate hinge(s) may be formed in any one of the sections indicated by the arrows P1 to P3. For instance, when the intermediate hinge is formed at the section indicated by the arrow P1, the zipper tape 120 is not bonded to the film 110 yet. Accordingly, the intermediate hinge can be provided without affecting the film 110. When, for instance, the punched holes 133A, 133B as in the third exemplary embodiment are to be formed, in order to ensure the strength and sealability of the bag body, it is preferable that the punched holes 133A, 133B are formed before bonding the zipper tape 120 to the film 110. In contrast, when the intermediate hinge is formed in the sections indicated by the arrows P2 to P4, for instance, the thin portions 131A, 131B or the cuts 132A, 132B are also formed in the film 110. However, since the intermediate hinge is formed in the section near the section for forming the side seal portions 113 between the facing surfaces 111A, 111B, the positioning accuracy between the intermediate hinge and the side seal portions 113 (i.e. the ends of the zipper tape 120) is improvable.

It should be noted that the zipper-tape bag, which is manufactured by the three-side-seal bag-making machine in the above examples, is not necessarily manufactured by the three-side-seal bag-making machine. For instance, a zipper-tape bag having the zipper tape provided with the intermediate hinge can be manufactured by various other bag-making machines, where the device described with reference to FIG. 13 is installed between the sections for the step for feeding the zipper tape and the step for bonding the zipper tape onto the film, or after the section for the step for bonding the zipper tape onto the film.

Suitable exemplary embodiments of the invention have been described above in detail with reference to the attached drawings. However, the scope of the invention is not limited to the exemplary embodiments. It would be obvious for those skilled in the art pertinent to the invention to conceive various modifications or variations within the technical ideas mentioned in claim(s) and these modifications and variations are naturally understood to be within the technical scope of the invention.

The invention claimed is:

1. A zipper-tape bag comprising:

a bag body comprising at least a pair of facing surfaces; and an elongated zipper tape whose cross sectional profile comprises:

first and second bases each bonded to corresponding one of the pair of facing surfaces; and mutually engageable first and second engagement portions respectively protruded from the first and second bases, wherein at least one intermediate hinge is provided on at least one point of the zipper tape in a longitudinal direction of the zipper tape, and wherein the intermediate hinge is provided such that the first engagement portion near the intermediate hinge is bent away from the second engagement portion when the pair of facing surfaces are oppositely slid along the longitudinal direction of the zipper tape, and wherein an engagement strength when the first and second engagement portions are mutually engaged is 26 N/50 mm or more.

2. The zipper-tape bag according to claim 1, wherein the intermediate hinge comprises a thin portion or a cut provided to each of the first and second engagement portions.

3. The zipper-tape bag according to claim 2, wherein the intermediate hinge comprises a punched hole penetrating through the first and second engagement portions and the first and second bases.

4. The zipper-tape bag according to claim 1, wherein the at least one intermediate hinge comprises intermediate hinges provided on at least two points on the zipper tape in the longitudinal direction.

5. The zipper-tape bag according to claim 4, wherein the at least one intermediate hinge is provided on two points on the zipper tape equidistant from a midpoint of the zipper tape in the longitudinal direction.

6. The zipper-tape bag according to claim 4, further comprising an antislip structure provided on at least one of the pair of facing surfaces between the at least two points.

7. The zipper-tape bag according to claim 1, wherein an antislip structure is provided on at least one of the pair of facing surfaces between the at least one point and corresponding one of ends of the zipper tape in the longitudinal direction.

8. The zipper-tape bag according to claim 1, wherein the zipper tape defines a side of a housing space defined between the pair of facing surfaces, the first base is bonded to one of the pair of facing surfaces both at a region near the housing space and a region opposite the housing space with respect to the first engagement portion, and the second base is bonded to the other of the pair of facing surfaces at a region near the housing space with respect to the second engagement portion, and is not bonded to the pair of facing surfaces at a region opposite the housing space with respect to the second engagement portion.

9. The zipper-tape bag according to claim 8, wherein a width of the region of the second base opposite the housing space with respect to the second engagement portion is smaller than a width of the region of the first base opposite the housing space with respect to the first engagement portion.

10. The zipper-tape bag according to claim 8, wherein the width of the region of the second base opposite the housing space with respect to the second engagement portion is 0.

11. The zipper-tape bag according to claim 1, wherein an engagement strength when the first and second engagement portions are mutually engaged is 40 N/50 mm or more.

12. A manufacturing method of a zipper-tape bag, the method comprising:

feeding an elongated zipper tape whose cross sectional profile comprises: first and second bases; and mutually engageable first and second engagement portions respectively protruded from the first and second bases;

bonding the first and second bases respectively on a pair of mutually facing films; and bonding the films with each other to form a bag body, wherein the method further comprises forming an intermediate hinge at least one point of the zipper tape in a longitudinal direction of the zipper tape, and wherein the intermediate hinge is provided such that the first engagement portion near the intermediate hinge is bent away from the second engagement portion when a pair of facing surfaces of the bag body are oppositely slid along the longitudinal direction of the zipper tape, and wherein an engagement strength when the first and second engagement portions are mutually engaged is 26 N/50 mm or more.

13. The manufacturing method of a zipper-tape bag according to claim 12, wherein the forming of the intermediate hinge is performed between the feeding of the zipper tape and the bonding of the first and second bases onto the respective films.

14. The manufacturing method of a zipper-tape bag according to claim 12, wherein the forming of the intermediate hinge is performed after the bonding of the first and second bases onto the respective films.

* * * * *